UNITED STATES PATENT OFFICE.

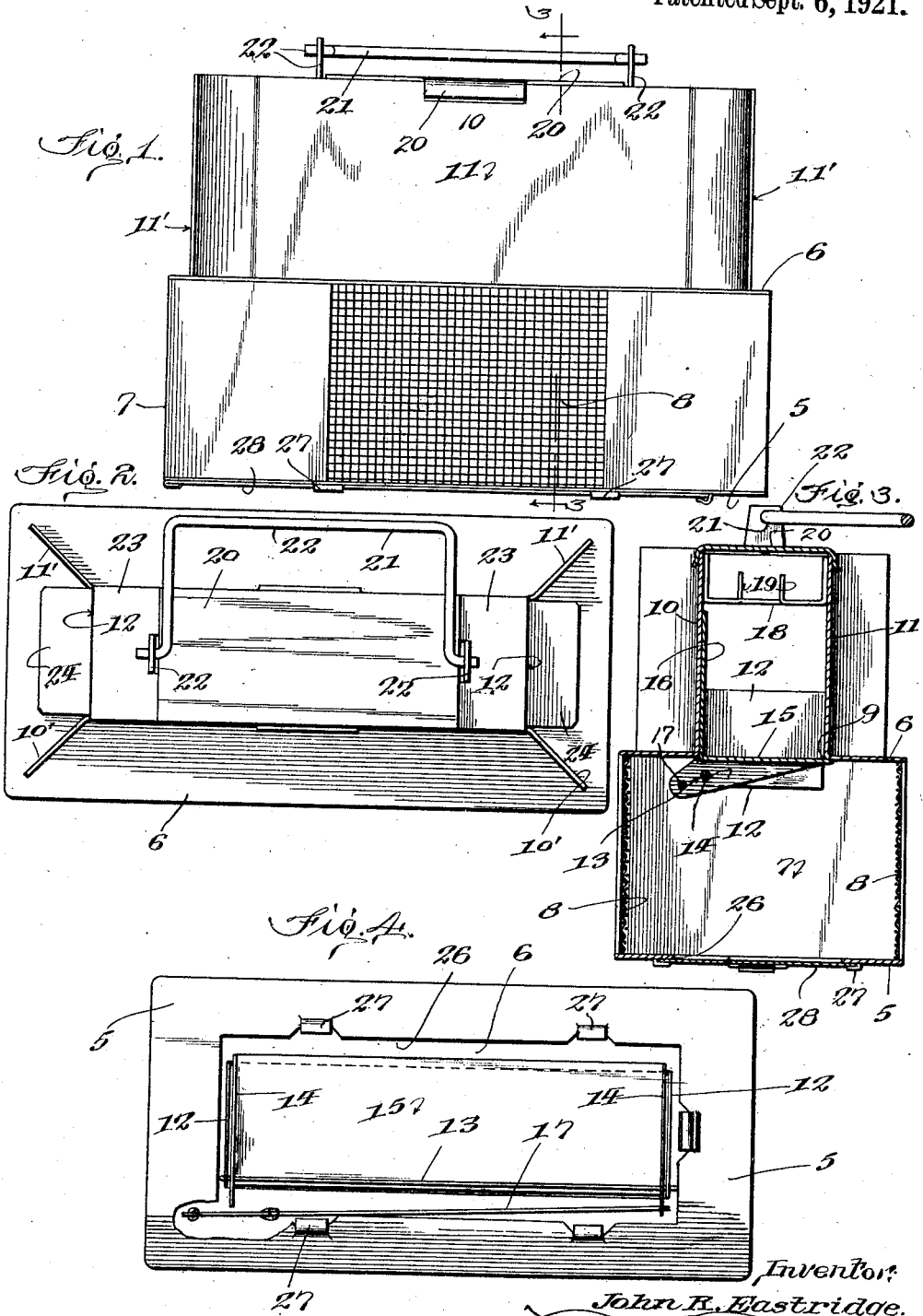

JOHN R. EASTRIDGE, OF WASHINGTON, DISTRICT OF COLUMBIA.

ANIMAL-TRAP.

1,389,636.  Specification of Letters Patent.  Patented Sept. 6, 1921.

Application filed March 17, 1921. Serial No. 452,979.

*To all whom it may concern:*

Be it known that I, JOHN R. EASTRIDGE, a citizen of the United States, residing at Washington, in the District of Columbia, have invented certain new and useful Improvements in Animal-Traps; and I do hereby declare the following to be a full, clear, and exact description of the invention, such as will enable others skilled in the art to which it appertains to make and use the same.

This invention relates to animal traps and while is is particularly designed to catch mice, it will be understood that its size and proportions may be modified as may be necessary to fit it for the trapping of other animals having similar propensities.

It is the object of the invention to provide an improved animal trap that may be easily baited but in which the bait cannot be attacked excepting from such positions as will effect capture of the animal.

A further object of the invention is to provide a construction that will be positive in its operation and which may be made at such low cost as will insure its commercial success.

In the drawings:

Figure 1 is a side elevation showing a trap embodying the present invention.

Fig. 2 is a top plan view of the trap.

Fig. 3 is a vertical section on the line 3—3 of Fig. 1.

Fig. 4 is a bottom plan view of the trap with the bottom plate removed.

Referring now to the drawings, the present trap comprises a body or pound that includes a bottom 5 of sheet metal, a top 6 of sheet metal and end members 7 of sheet metal that extend also partway around the sides of the body with their vertical edges spaced apart and between which vertical edges is arranged a screen 8 that gives a view to the interior of the body.

In the top 6 is formed an opening 9 that terminates short of the ends of the body and also short of its side and from the sides of this opening there arise the walls 10 and 11 respectively, the end portions of which are flared as shown at 10' and 11'.

Against the ends of the opening 9 are secured plates 12 that extend both above and below the top 6 and continuously from the wall 10 to the wall 11 and through the depending portions of the plates 12 is passed a pivot rod 13 that is engaged also through the ears 14 that are turned downwardly from the ends of the base portion 15 of an angular plate that includes also the normally vertical portion 16. This angular plate in its normal position lies with its portion 15 closing the opening 9 and with its free longitudinal edge portion against the under face of the top plate 6 directly beneath the wall 11 and with the vertical portion 16 close against the wall 10. The portion 15 extends throughout the length of the opening 9 so as to completely close it normally and when a weight is placed on the portion 15, the latter swings downwardly on the pivot 13 until the portion 16 strikes the wall 11, said portion 15 having a greater transverse extent than the distance between the walls 10 and 11. To hold the angular plate yieldably in its normal position, a spring wire rod 17 is fixed at one end to one of the ears 14 to the rear of the pivot rod 13 and has its other end soldered to the under face of the top plate 6. This spring rod 17 is tensioned to press the corresponding end portion of the ear 14 downwardly to swing the closure member 15 upwardly and hold it so.

A bait holder is provided and consists of a U-shaped plate 18, the spaced arms of which are directed upwardly and soldered against the inner faces of the walls 10 and 11 so that the connecting portion of the plates is spaced below the upper edges of the walls and from this latter portion of the plate are struck up the teeth 19 that enter into the bait that is pressed downwardly over them and serve to hold the bait against movement. To prevent access to the bait excepting from below it, a cover plate 20 is provided, the longitudinal edge portions of which are bent downwardly and are fitted over the walls 10 and 11, this cover plate extending well beyond the ends of the bait holder.

To facilitate carrying the trap, a U-shaped handle 21 having its outwardly directed end portions engaged in the ears 22 that are struck upwardly from the plates 23 are secured transversely between and to the walls 10 and 11.

In the operation of the trap, the bait is placed as above described to attract the animal to enter over either of the plates 12 and between the walls 10 and 11, the plates 12 having their upper end portions directly outwardly and horizontally as shown at 24 so that the animal will first climb onto the corresponding portion 24 and in moving toward the bait, will pass downwardly onto the tilting member 15, the height of the portion 12 above the member 15 being such as to urge the animal to continue its descent when once begun. As soon as the weight of the animal is shifted to the member 15 of the angular plate, this plate is tilted and the animal slides off of the portion 15 and into the pound therebelow. As soon as the member 15 starts to swing downwardly, the member 16 swings with its upper edge toward the wall 11, thus assuming a position over the animal to prevent it from jumping back and to prevent those animals within the pound, from passing upwardly therefrom. The angular plate is made of metal and offers no foothold for the animal so that it slides quickly into the pound and when the angular plate 15 is relieved of the weight of the animal, the plate returns to its normal position.

To permit of removal of the animals, the bottom of the pound has an opening 26 at the sides and end of which are formed the ears 27 between which and the under face of the bottom of the pound or body there is slidably disposed a closure plate 28 that may be readily withdrawn and returned.

What is claimed is:

1. A trap comprising a pound having an opening in its top, spaced walls rising from the longitudinal edges of the opening, plates disposed against the ends of the opening and extending above and below the top of the pound between the said walls from one to the other, the upper portions of said plates being extended outwardly, a closure plate for the opening pivotally connected with the portions of the end plates that depend below the top of the pound, means for holding the closure plate yieldably in closed position and against downward movement, and a bait holder mounted between the walls intermediate the ends of the said opening.

2. A trap comprising a pound having an opening in its top, spaced walls rising from the longitudinal edges of the opening, plates disposed against the ends of the opening and extending above and below the top of the pound between the said walls from one to the other, the upper portions of said plates being extended outwardly, a closure plate for the opening pivotally connected with the portions of the end plates that depend below the top of the pound, means for holding the closure plate yieldably in closed position and against downward movement, and a bait holder mounted between the walls intermediate the ends of the said opening, the bait holder consisting of a U-shaped plate having its arms directed upwardly and secured against the inner faces of the walls and having teeth struck upwardly from it, and a cover removably disposed over the bait holder and the corresponding portions of the walls.

3. An animal trap comprising a pound having an opening in its top and walls rising from the longitudinal edges of the opening, plates disposed against the end edges of the opening, the plates extending above and below the top of the pound and from one wall to the other and having their upper end portions directed outwardly, an angular plate, the ends of one member of which are turned downwardly at right angles away from the other member to constitute ears, which latter extend laterally beyond the other member of the angular plate, a pivot engaged through said ears and the depending portions of the end plates, a spring rod fixed to the laterally extending portion of one of the ears and to the under face of the top of the pound under tension to hold the angular plate normally with the eared member in closing relation to the opening and the other member against the inner face of one of the walls, a bait holder secured between the walls above said angular plate and a removable cover for the bait holder engaged with the upper portions of the walls.

In testimony whereof I affix my signature, in the presence of two witnesses.

JOHN R. EASTRIDGE.

Witnesses:
ALBERT S. GATLEY,
WILLIAM E. NOBBE.